Feb. 8, 1966   E. L. HOLT ETAL   3,234,116
METHOD OF OPERATING A FUEL CELL TO PRODUCE
KETONES AND ELECTRIC CURRENT
Filed Jan. 2, 1962
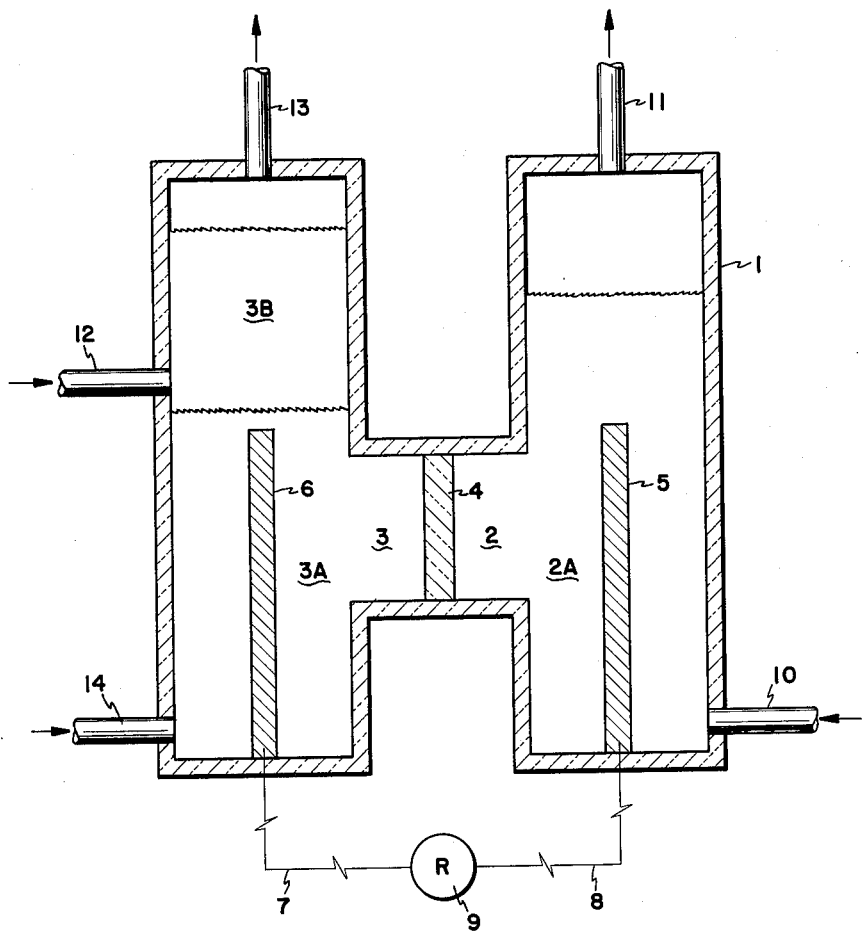
Eugene L. Holt   INVENTORS
Barry L. Tarmy
BY *Olin B. Johnson*
PATENT ATTORNEY United States Patent Office 3,234,116
Patented Feb. 8, 1966

3,234,116
METHOD OF OPERATING A FUEL CELL TO PRODUCE KETONES AND ELECTRIC CURRENT
Eugene L. Holt, Forest Hills, N.Y., and Barry L. Tarmy, Berkeley Heights, N.J., assignors to Esso Research and Engineering Company, a corporation of Delaware
Filed Jan. 2, 1962, Ser. No. 163,832
8 Claims. (Cl. 204—80)

This invention relates to electrochemical conversion of chemical energy to electrical energy. In particular, this invention relates to a novel fuel cell and to a novel fuel cell process for simultaneous production of electrical energy and valuable organic compounds. More particularly, this invention relates to a novel redox fuel cell employing an iodine-iodide ion redox couple and an olefinic primary fuel.

The term "fuel cell" is used herein and in the art to denote a device, system or apparatus wherein chemical energy is electrochemically converted to electrical energy. The true fuel cell when adapted for continuous operation includes two nonsacrificial or inert electrodes, functioning as an anode and cathode, respectively, which are separated by an electrolyte which provides ionic conductance therebetween, conduction means for electrical connection between such anode and cathode external to such electrolyte, means for admitting a "fuel" into dual contact with the anode and electrolyte and means for admitting an oxidant into dual contact with the cathode and electrolyte. Where necessary or desired, the electrolyte compartment is divided into an anolyte compartment and a catholyte compartment by an ion-permeable partition. Thus, in each such cell a fuel is oxidized at the anode with a release of electrons to such anode and an oxidant is reduced at the cathode upon receiving electrons from such cathode. The cathodic half-cell is essentially independent of the anodic half-cell reaction aside from being a part of the same electrical circuit.

Fuel cells wherein the sole or primary fuel is oxidized at the anode are commonly referred to as "direct fuel cells."

Fuel cells which employ chemical intermediates which intervene between the primary fuel and the anode, are oxidized at such anode, and regenerated by a primary fuel or energy source are commonly referred to as "redox fuel cells." It is with the redox type of cell that this invention is concerned.

Various redox type fuel cell systems have been investigated in the past but these efforts have met with only limited success. In the cells employed in the past an intermediate reductant is oxidized at the anode and separately regenerated in an external regeneration zone. Certain of these cells also employ an intermediate oxidant which is reduced at the cathode and likewise separately regenerated. External regeneration necessitates continuous recycling of the intermediate oxidant and/or reductant. Various regeneration systems have been proposed for use with such cells employing various energy sources, e.g. photochemical, radiochemical, electrolytic, thermal, and chemical reaction with a primary fuel external to the cell. Inefficient regeneration, low reaction rates, expensive primary fuels, and engineering complexities in the circulation of electrolyte between the cell and regeneration zones have limited development of this type of cell.

It now has been discovered that a redox fuel cell can be effectively operated to generate electrical energy while at the same time producing valuable organic compounds by utilizing an $I_2$–$I^-$ redox couple with a primary fuel or energy source comprising an organic compound containing an olefinic carbon to carbon linkage.

In accordance with this invention the cathodic half-cell is operated either directly with oxygen gas constituting the oxidant or as a redox half-cell wherein an intermediate oxidant is regenerated by a primary oxidant. In the operation of the anodic half-cell the intermediate reductant, the iodide ion, is introduced into the anolyte either as elemental iodine in the organic layer or in the form of a water soluble compound which will release the iodide ion in solution. This ion is electrochemically oxidized at the anode forming elemental iodine which comes into contact with the olefinic compound, preferably within the anolyte compartment, and forms the corresponding organic diiodide via addition at the olefinic bond. The diiodide in contact with the electrolyte is hydrolyzed releasing hydriodic acid and the iodide ion is regenerated by ionization of such acid. The iodide ion is then ready to return to the anode and repeat the cycle while the olefinic compound has been converted into a valuable oxygenated compound. Such compound may be recovered from the cell and employed in accordance with its normal uses or left in the cell to react at an anode thereof as in a direct fuel cell.

The cathodic half-cell may be operated as in a direct fuel cell by bringing oxygen gas, either as pure oxygen or in admixture with other gases such as air, into dual contact with the cathode and the catholyte. In a preferred alternative, nitric acid can be added to the catholyte and air or oxygen admitted to the catholyte to regenerate reduction products thereof, e.g. NO and/or $NO_2$.

It is preferred to carry out the regenerative steps of the process of this invention within the cell, i.e. within the half-cell with which such step is associated. However, it is within the scope of this invention to remove either the intermediate reductant or the intermediate oxidant for external regeneration.

In accordance with this invention the electrolyte compartment of the cell is preferably partitioned into an anolyte compartment and a catholyte compartment by an ion-permeable partition. However, it should be understood that the use of such a partition in the electrolyte compartment of a fuel cell is known in the art and that this invention does not claim the discovery of any new or different materials for the construction of such partition. Materials that have been used for this purpose are hereinatfer described in detail.

A preferred cell of this invention employs an $I_2$–$I^-$ redox couple with a liquid olefin, i.e. a $C_nH_{2n}$ hydrocarbon. In this embodiment an aqueous sulfuric acid electrolyte, e.g. 30 wt. percent $H_2SO_4$ is introduced into both the anolyte and catholyte compartments which are separated by an ion-permeable partition. A source of iodide ion, e.g. HI, KI, NaI, etc., is admitted to the anolyte. A liquid olefin, e.g. 2-methylbutene-2 is added to the anolyte forming a primarily organic layer above the aqueous electrolyte. Nitric acid is admitted to the catholyte and air or oxygen gas is bubbled through or otherwise admitted to the mixed acid catholyte.

Upon bringing the aforementioned components together under the conditions of reaction hereinafter set forth, the generation of electrical energy with concurrent chemical production proceeds rapidly. Iodide ions are discharged at the anode with a standard potential of about 0.535 volt below Standard Hydrogen Reference and the resulting $I_2$ is regenerated rapidly. The $I_2$ contacts and permeates the organic layer above the electrolyte and adds to the olefinic double bond forming the corresponding diiodide. In the presence of the electrolyte this compound hydrolyzes liberating hydriodic acid and yielding an oxygenated organic compound. With this feedstock it is apparent that a glycol is first formed which upon standing in the presence of the electrolyte is converted to the corresponding ketone via a pinacolone rearrangement. Where the ketone formed has hydrogen atoms alpha to the carbonyl group, a substitution reaction occurs upon further contact with the iodine to form a corresponding iodoketone. The hydriodic acid is immediately ionized and the electrochemical cycle is repeated. The oxygenated product, which may include an iodocarbonyl product, can then be removed from the cell and recovered by conventional separation processes or allowed to remain in the cell until oxidized at the anode as in a conventional direct fuel cell. The iodide ion can be introduced as elemental iodine since the regeneration reaction will quickly establish a working concentration of iodide ions.

In another embodiment the olefin is bubbled through the anolyte as a gas.

It is preferred to employ an olefinic primary fuel that will remain in liquid state at the conditions of temperature and pressure employed since the presence of a separate organic liquid phase permits a build-up of high iodine concentration in this layer resulting in more rapid regeneration and minimizing the amount of elemental iodine in the aqueous electrolyte. The presence of iodine in this organic layer also raises the boiling point of the resulting reactant-product mixture thus permitting the use of an olefinic primary fuel in this embodiment which in the pure state would change from a liquid to a gas at the temperature employed.

Any olefinic compound may be used which does not substantially impede the aforedescribed reaction cycle. The organic feed may therefore be a hydrocarbon feed consisting of olefins, diolefins or a mixture of the same or may consist of on include substituted hydrocarbons. Particularly preferred feedstocks are the tertiary olefinic compounds, including hydrocarbon olefins, and diolefins and oxygen-substituted hydrocarbons such as unsaturated alcohols, aldehydes, carboxylic acids, and ketones. Olefinic feeds, i.e. substituted hydrocarbons, which contain substituents other than oxygen can, of course, be used where it is desired in order to create a particular product containing such substituent or group, and such substituent does not interfere with the addition of iodine to the double bond or the subsequent hydrolysis of the diiodide. When a hydrocarbon feed is used, it is preferred to employ a $C_2$ to $C_{12}$, preferably a $C_4$ to $C_{10}$, and more preferably a $C_5$ to $C_8$, aliphatic monoolefin, e.g. ethylene, isobutylene, butene-2, a hexene, an octene, a decene or a duodecene. Of these the tertiary olefins are preferred. However, it is within the scope of this invention to employ cyclic olefins, e.g. cyclohexene, and aromatic hydrocarbons having an olefinic unsaturation in a side chain substituent on the aromatic nucleus, e.g. styrene.

Any concentration of iodide ions or iodine up to the saturation point of the organic and aqueous phases may be used. It is preferred to employ an iodide yielding salt in amounts in the range of about 0.1 to 4 equivalents per liter of anolyte or greater. Routine testing will reveal the concentration most suitable with a particular electrolyte and organic feed.

Temperatures above about 70° F. and below the boiling point of the electrolyte employed can be used. It is preferred to employ a temperature in the range of about 130° to 200° F., preferably about 140° to 185° F., at atmospheric pressure.

Pressures above atmospheric can be used and are particularly useful with low molecular weight olefin feeds such as ethylene or propylene. Thus, pressures can be employed in the range of about 0 to 300 p.s.i.g. or greater with pressures in the range of about 0 to 30 p.s.i.g. preferred.

The aqueous electrolyte employed may contain either sulfuric acid or phosphoric acid. Both are known in the are as fuel cell electrolytes and may be employed herein in the conventional concentrations for such electrolytes. Thus, it is preferred to employ $H_2SO_4$ in concentrations in the range of about 3 to 50 wt. percent, preferably about 20 to 40 wt. percent and most preferably about 25 to 35 wt. percent. It is usually advisable to employ phosphoric acid concentrations which correspond to the higher portion of the range employed with sulfuric acid or slightly higher.

Partitions that can be used between the anolyte and catholyte include glass frits, certain porous ceramics and ion-permeable membranes. Membranes that can be used for this purpose include both ion-exchange resin membranes and interpolymer membranes.

Ion-exchange resin membranes, i.e., organic membranes, at least one component of which is a polyelectrolyte, are well known in the art. Such membranes include in their polymeric structure dissociable ionizable radicals at least one ionic component of which is fixed to or retained by a polymeric matrix with at least one ion component being a mobile and replaceable ion electrostatically associated with the first component. The ability of the mobile ion to be replaced under appropriate conditions by other ions imparts ion-exchange characteristics to these materials.

An interpolymer membrane is one which is cast from a solution containing both a polymeric electrolyte or ionogenic material and a matrix polymer so as to form a film composed of these two intermeshed molecular species. A typical interpolymer membrane is made by dissolving linear polystyrene sulfonic acid and acrylonitrile in N,N-dimethylformamide, casting the solution as a film and evaporating off the solvent.

Referring now to the drawing one embodiment of the invention is illustrated by a schematic view of a cell which can be used in this invention. Vessel 1, made of glass, ceramic, polypropylene, hard rubber, metal or other suitable electrolyte resistant material, is divided into a catholyte compartment 2 and an anolyte compartment 3 by an ion-permeable partition 4, e.g., a sintered glass frit. Inside catholyte compartment 2 is positioned a cathode 5 immersed in an aqueous catholyte 2A, e.g. an aqueous solution containing 30 wt. percent $H_2SO_4$ and about 0.4–6 wt. percent or more $HNO_3$. $HNO_3$ concentrations up to 30 wt. percent or more can be used but the advantages in increased reaction rate at concentrations above about 6 wt. percent must be balanced against other complications resulting from the higher concentrations. Inside anolyte compartment 3 is positioned an anode 6 immersed in an aqueous anolyte 3A containing about 30 wt. percent $H_2SO_4$ and floating on top thereof a layer of liquid olefin 3B, e.g. an aliphatic $C_5$–$C_8$ olefin. Cathode 5 and anode 6 are electrically connected by wires 7 and 8 and resistance means 9 which represents any device for utilizing the electrical power generated by the cell or may be merely an extension of wires 7 and 8. Cathode 5 and anode 6 may take the form of grids or plates as shown here. In the alternative a porous cathode may be used with suitable modifications of cell design to allow for passage of oxygen or air from outside the cell into the cathode. The electrodes may consist of or be surfaced with noble metals of Group VIII of the Periodic Table or gold or alloys of the same. They may also consist of porous carbon either with or without catalyst impregnation. Conduit 10 provides means for admitting an oxidizing gas into the catholyte. Conduit 11 provides exhaust means from catholyte compartment 2 through which spent air can be evacuated or reduction products of $HNO_3$ removed for external regeneration. In the alternative, conduit 11 can be closed and oxygen gas admitted through conduit 10 for internal regeneration. Conduit 12 provides means for admitting the olefinic primary fuel 3B into the upper part of anolyte compartment 3. Conduit 13 provides means for overhead removal from anolyte compartment 3, e.g. where a gaseous olefin is passed through the anolyte. Conduit 14 provides means for admitting an olefin feed, iodine or electrolyte to anolyte compartment 3. It is to be understood that the cell design and direction of flow through these conduits may be modified within the scope of the invention.

This invention will be more fully understood from the following examples which are for purposes of illustration only, and should not be construed as limitations upon the scope of this invention as set forth in the appended claims.

EXAMPLE 1

A glass cell constructed essentially as shown in the drawing was operated at atmospheric pressure at 122° F. in the following manner. Over a 30 wt. percent aqueous sulfuric acid anolyte containing 2 moles KI per liter was floated a liquid olefin, 2-methylbutene-2. The aqueous catholyte employed was 30 wt. percent $H_2SO_4$ containing 5 wt. percent $HNO_3$ partitioned from the anolyte by an ion-permeable sintered glass frit. The anode and cathode were both platinum gauze. Oxygen gas was sparged through the catholyte. The cell was operated for a period of time equivalent to 7 complete regenerations of the iodide present in the anolyte. Current densities of from 3.3 to 27 amps./ft.$^2$ (superficial anode surface) were maintained during the run at anode potentials of from 0.4 to 0.5 volt below Standard Hydrogen Reference. Cathode potential ranged between 0.8 and 0.9 volt below Standard Hydrogen Reference. The resulting organic layer contained about 32.6% unreacted olefin, 3.1% acetone, 53.5% methyl isopropyl ketone and 10.8% of iodine substitution products of methyl isopropyl ketone, i.e. such ketone with one or more of the hydrogen atoms of the methyl group attached to carbonyl group replaced with an iodine atom.

EXAMPLE 2

In another run the following changes were made. The KI concentration in the anolyte was 1 mole per liter, the glass frit partition was replaced with cation-exchange membrane, gaseous isobutylene was employed as the primary fuel and the electrolyte temperature was 149° F. A current density of 100 amps./ft.$^2$ were drawn from the cell. The anode potential was 0.75 volt below Standard Hydrogen Reference.

EXAMPLE 3

Another run was carried out using an uncatalyzed carbon electrode in an aqueous anolyte containing 1 mole $H_3PO_4$ and 1 mole KI per liter and isobutylene was employed as the fuel. A current density of 14 amps./ft.$^2$ was measured at the anode at an anode potential of 0.56 volt below Standard Hydrogen Reference.

EXAMPLE 4

Another run was made with the same anolyte and fuel as in Example 3 and the anode was porous carbon impregnated with about 1–2 wt. percent of a metal mixture containing 95% Pt and 5% Au. A current density of 15 amps./ft.$^2$ was obtained. The anode potential was 0.48 volt below Standard Hydrogen Reference.

The terms "anode" and "fuel electrode" are used interchangeably herein.

The terms "mixture" and "acid mixture" are used herein to refer to any intermingling of two or more acids including mixed solutions.

What is claimed is:

1. A method of operating a fuel cell to produce ketones and an electric current which comprises introducing a fluid olefin into contact with the anolyte of a fuel cell, said anolyte comprising a mineral acid selected from the group consisting of sulfuric acid and phosphoric acid, and an ionizable iodide, and recovering the ketone product formed.

2. A method of operating a fuel cell to produce a ketone and an electric current which comprises introducing a fluid olefin into contact with the anolyte of a fuel cell, said anolyte comprising an aqueous mixture of sulfuric acid and an ionizable iodide, and recovering the ketone product formed.

3. A method in accordance with claim 2 wherein said olefin is a tertiary olefin.

4. A method in accordance with claim 2 wherein said acid concentration is in the range of about 20 to 40 wt. percent.

5. A method as in claim 2 wherein said olefin is a cyclic olefin.

6. A method as in claim 2 wherein said olefin is a monoolefin.

7. A method of operating a fuel cell to produce a ketone and an electric current which comprises introducing 2-methylbutene-2 into contact with the anolyte of a fuel cell, said anolyte comprising a mixture of 30 wt. percent sulfuric acid and 2 moles of potassium iodide per liter, and recovering the isopropyl ketone formed.

8. A method of operating a fuel cell to produce a ketone and an electric current which comprises introducing isobutylene into contact with the anolyte of a fuel cell, said anolyte comprising a mixture of sulfuric acid and potassium iodide, and recovering the methyl-ethyl ketone formed.

References Cited by the Examiner

UNITED STATES PATENTS

| | | | |
|---|---|---|---|
| 666,387 | 1/1901 | Kynaston | 204—1.06 |
| 1,365,053 | 1/1921 | Ellis et al. | 204—80 |
| 2,355,703 | 8/1944 | Byrns | 260—597 |
| 2,384,463 | 9/1945 | Gunn et al. | 136—86 |
| 2,879,300 | 3/1959 | Cheney et al. | 260—597 X |
| 2,941,007 | 6/1960 | Callahan et al. | 260—597 X |
| 3,147,203 | 9/1964 | Klass | 204—80 |

OTHER REFERENCES

Status Report on Fuel Cells: B. R. Stein, June 1959, pages 18–20 and pages 60–62.

WINSTON A. DOUGLAS, *Primary Examiner.*

JOHN R. SPECK, *Examiner.*